United States Patent [19]

Hendrickson

[11] 4,087,577
[45] May 2, 1978

[54] SCRIM REINFORCED PLASTIC FILM

[75] Inventor: Thomas C. Hendrickson, South River, N.J.

[73] Assignee: Colgate-Palmolive Company, New York, N.Y.

[21] Appl. No.: 746,915

[22] Filed: Dec. 2, 1976

[51] Int. Cl.² .............................................. B32B 5/12
[52] U.S. Cl. ...................................... 428/110; 156/85; 156/309; 428/247; 428/255; 428/337; 428/369
[58] Field of Search ............... 428/109, 110, 105, 138, 428/225, 246, 247, 111, 212, 255, 229, 337, 369; 156/84, 85, 309

[56] References Cited

U.S. PATENT DOCUMENTS

| 2,281,635 | 5/1942 | Strauss | 428/247 |
| 2,742,391 | 4/1956 | Warp | 428/247 |
| 3,058,863 | 10/1962 | Gaines et al. | 428/114 |
| 3,214,320 | 10/1965 | Lappala et al. | 428/134 |
| 3,222,237 | 12/1965 | McKelvy | 428/110 |
| 3,310,453 | 3/1967 | Lappala et al. | 428/109 |
| 3,444,024 | 5/1969 | Hillas | 156/306 |
| 3,535,180 | 10/1970 | Gasaway | 156/178 |
| 3,616,130 | 10/1971 | Rogosch | 428/110 |
| 3,762,983 | 10/1973 | Osborn | 428/292 |

Primary Examiner—James J. Bell
Attorney, Agent, or Firm—Herbert S. Sylvester; Murray M. Grill; Kenneth A. Koch

[57] ABSTRACT

Process for forming a scrim-reinforced film wherein a molten, film-forming plastic, such as polyethylene, in a high state of fluidity is fed onto an unsupported scrim and solidified by cooling to produce a scrim at least substantially completely enclosed and surrounded by the plastic. The film, thus produced, can be formed into a high strength bag container by a folding and cutting operation utilizing hot knife means capable of fusing and thus sealing the plastic. In a preferred embodiment, the plastic is extruded onto the scrim and is subsequently heat shrunk to cause the scrim fibers to buckle and give the appearance and feel as well as the strength of a reinforced material.

6 Claims, 6 Drawing Figures

U.S. Patent    May 2, 1978    4,087,577
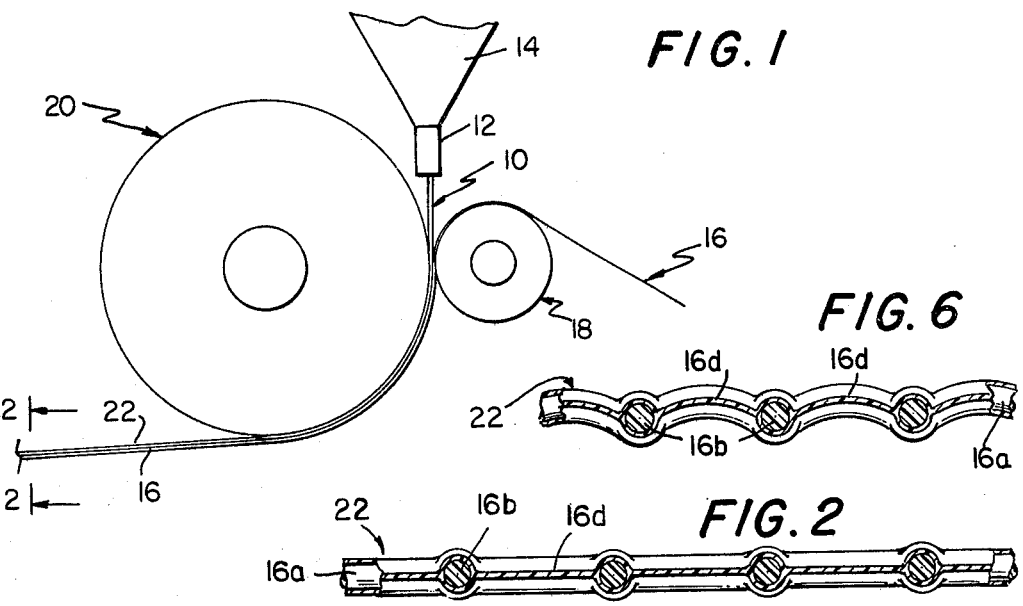
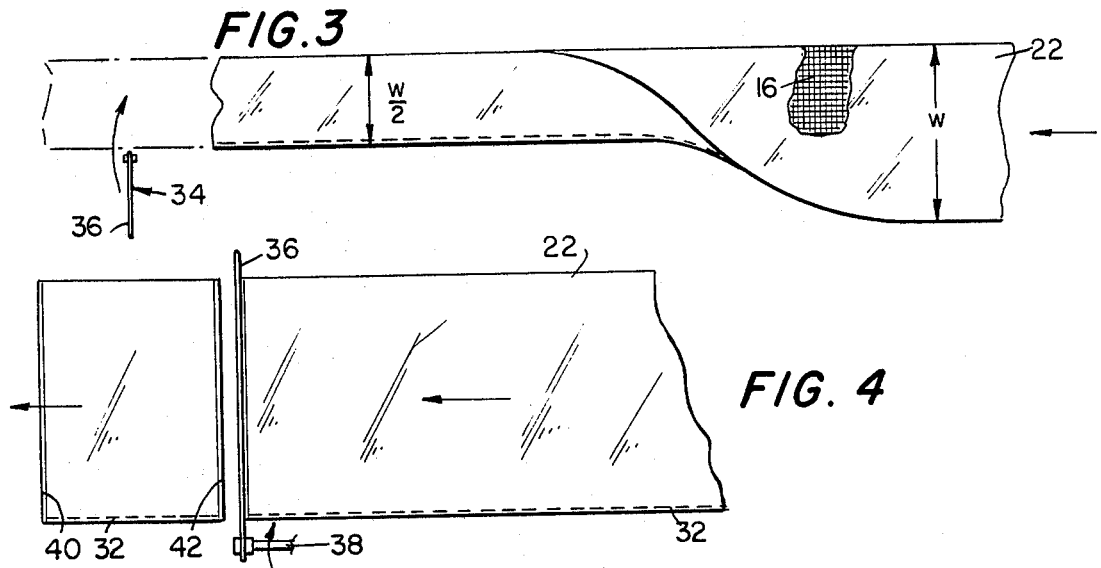
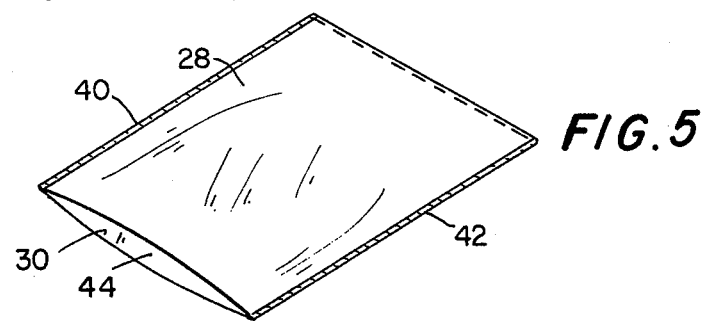

SCRIM REINFORCED PLASTIC FILM

BACKGROUND OF THE INVENTION

1. Field of the Invention

This invention relates to scrim-reinforced plastic film and a process for the preparation thereof and particularly to such film having improved strength properties, the film being advantageously adapted for use in preparing various types of containers, such as envelopes, bags etc. The reinforced film material exhibits the looks and feel of a strong material as well as being stronger than the unreinforced material.

2. Description of the Prior Art

Methods for the preparation of scrim-reinforced plastic sheet are well known in the art. Since plastic materials currently available commercially lend themselves advantageously to a wide variety of uses and particularly in the packaging of consumer goods, there has been an ever-increasing emphasis on developing means to further enhance the strength properties of such materials. Thus, tensile strength, tear and impact resistance, moistureproofing and the like are especially important properties as regards container utility. The use of scrims, these usually comprising web material formed of spaced-apart strands of high strength thermo-plastic resinous material, to reinforce plastic sheets has proved particularly effective in augmenting tensile strength, tear resistance and the like. Additionally, it has been found that a reinforced material, whether in the form of sheet or bags is more appealing to the consumer and more saleable if the reinforcement is readily discernible both visually and tactilely. One method commonly used for the preparation of scrim-reinforced plastic sheet involves sandwiching a scrim member between two sheets of thermoplastic material the assembly thereafter being heatbonded by various means, e.g. contacting opposed sides of the sandwich assembly with heated platens, radiant heating etc. Thus, one such method involves the radiant heating of the edge portions of plastic material folded back on a scrim member to form an envelope portion. Other methods involve, for example, the application of adhesive to the scrim or web and/or the inner surfaces of the plastic sandwiching elements and pressure-sealing the elements together; extruding one or more layers of thermoplastic material onto a supported scrim or web i.e., provided with a thermoplastic backing layer.

Methods of the aforedescribed type entail significant disadvantages. Thus, the use of heated rollers invariably results in an undesirably thin enclosing plastic film; moreover, the combined heat-pressure effects often causes structural weakening of the film and particularly in the critical areas situated outside of the strands. Extrusion of plastic onto a supported web or scrim requires the use of a plastic backing or supporting sheet. Thus, there may be significant differences in the strength characteristics as between the opposed plastic members sandwiching the web. Bonding can occur between the outer plastic elements, or between each of these and the intermediate web which can produce sub-optimum strength characteristics in the product.

The foregoing methods require formation of a sandwich type element wherein the outer plastic layers are separately provided. This requires rather burdensome techniques for carrying out continuous operations. This aspect combined with the sub-optimum strength characteristics often obtained in the final product underscore the need for more effective methods for preparing reinforced plastic sheets. The prior art methods, typically do not provide the reinforced material with the appearance and feel of reinforcement and therefore might not be appealing to the consumer.

Thus, a primary object of the invention is to provide a method for preparing reinforced plastic sheets wherein the foregoing and related disadvantages are eliminated or at least mitigated to a substantial extent.

Another object of the present invention is to provide such a method particularly advantageously adapted to continuous processing.

Yet another object of the invention is to provide such a method wherein any necessity for the use of heated pressure members such as platens to effect the bonding operation is eliminated.

Still another object of the invention is to provide such a method advantageously adapted to be carried out in conjunction with an extruder.

A further object of the invention is to provide such a method capable of producing a reinforced plastic sheet having improved strength properties including, tensile strength, tear resistance, impact resistance and the like.

A still further object of the invention is to provide such a method which can readily be integrated with a process for producing plastic containers such as envelopes, containers, etc. Yet a still further object of the invention is to provide a reinforced plastic sheet material having significantly improved strength characteristics.

A still further object of the invention is to provide a scrim reinforced plastic sheet wherein the scrim reinforcement is apparent both visually and tactilely.

Other objects and advantages of the invention will become more apparent hereinafter as the description proceeds.

SUMMARY OF THE INVENTION

The foregoing objects are attained in accordance with the invention which in its broader aspects provide a process for preparing a scrim or web reinforced film comprising contacting molten plastic in a state of high fluidity with an unsupported scrim, said plastic flowing into and around the scrim network, cooling the plastic to solidify same to produce a scrim or web at least substantially completely enclosed and surrounded by said plastic.

In accordance with a preferred embodiment, the molten plastic comprises the extrudate from the discharge orifice of an extruder, and is fed to a contact zone to contact the unsupported scrim the distance between the discharge orifice of the extruder and the contact zone being such that the temperature of the molten extrudate as it contacts the scrim is at least about 400° F and preferably at least about 600° F. According to a preferred embodiment of the invention, the scrim method comprises two sets of synthetic plastic fibers or stands disposed at an angle to each other, preferably transversely. Each set of strands includes a plurality of uniformly spaced, parallel fibers. The strands can be from about 1 to about 20 mils thick in their largest cross sectional dimension, preferably from about 3 to about 8 mils. The fibers can be present in an amount of 1 to 5 fibers per inch per direction.

In accordance with a further specific aspect of the invention, a method is provided to import a nubby or rough character to the scrim reinforced product that is both visible and tactilely discernible. In this regard, the new method includes the step of heat shrinking the film component of the scrim reinforced product by heating the product to a temperature between about 180° F and 225° F and cooling to room temperature. The heat shrinking step functions to bend or distort the scrim fibers, which are of a non-heat shrinkable material, out of the plane of the film to create a rough surface that is both tactilely and visually discernible by the user of the product. The scrim fibers are bent out of the plane of the film because the shrinking film draws the scrim intersection closer together, thereby forcing the fibers to bend. According to this aspect of the invention, the scrim fibers when plastic are made by a process including the step of heat setting which releases stresses, and result in plastic fibers that exhibit virtually no shrinkage when exposed to heat and cooled. The film material which should be a heat shrinkable substance can be supplied as a preformed film that is heat sealed or adhesively sealed to both sides of the scrim or it can be extruded onto the scrim according to the invention and subsequently heat shrunk to bend the scrim fibers and create the desired rough or nubby surface pattern.

The foregoing characteristics of the new reinforced material provides not only an actual and substantial increase in the strength of the material but also imparts the appearance and "feel" of strength to the product.

The invention is illustrated but not limited by reference to the accompanying drawing herein:

BRIEF DESCRIPTION OF THE DRAWINGS

FIG. 1 is a schematic view of an embodiment of the invention for producing a scrim-reinforced plastic sheet from a molten extrudate;

FIG. 2 is a sectional view taken along the line 2—2 in "FIG. 1, " before the scrim-reinforced plastic sheet is heat shrunk.

FIG. 3 is a plan view, shown partly broken away illustrating the scrim-reinforced sheet folded longitudinally prior to the cutting operation for forming the container;

FIG. 4 is a plan view illustrating schematically the cutting operation for forming the product bag container;

FIG. 5 is a perspective view illustrating the product container.

FIG. 6 is a sectional view taken along line 2—2 of FIG. 1 after the scrim-reinforced plastic sheet of FIG. 2 is heat shrunk.

DETAILED DESCRIPTION OF THE INVENTION

The invention is now described by reference to the accompanying drawing wherein like reference numerals designate similar parts throughout the views. "FIG. 1" illustrates an arrangement of apparatus for carrying out a preferred embodiment of the invention wherein a molten plastic extrudate 10 from the discharge orifice 12 of an extruder (illustrated partially) and generally designated 14 is directed onto a scrim or netting 16 carried by nip roll 18. Molten extrudate 10 contacts scrim 16 shortly prior to the latter entering the bite provided by chill roll 20 and nip roll 18, these members being positioned so as to tangentially enage opposed sides of the scrim and applied extrudate while the latter is in molten condition. It is essential in the practice of the present invention that the molten plastic extrudate, preferably a film-forming, thermoplastic heat shrunkable polymeric material to be described in greater detail hereinafter, be in a molten, highly fluid state when it contacts the scrim material. In general, the "contact" temperature of the molten plastic extrudate should be at least about 400° F and preferably at least about 600° F for optimum results and particularly for assuring a scrim-reinforced product wherein the scrim is completely enclosed and surrounded by the solidified plastic extrudate. The upper limiting contact temperature of the molten extrudate is not particularly critical apart from the requirment that it not exceed the decomposition point of the particular plastic material employed.

It is generally recommened that the speed of the nip roll be regulated to provide a linear scrim speed of from about 500 to 1,000 ft/min. as the scrim 16 passes between chill roll 20 and nip roll 18. Within the lower portion of the linear speed range stated, it is recommenced that the temperature of the molten extrudate be maintained within the higher range and/or the distance between the discharge orifice 12 of extruder 10 and the point of contacting the molten extrudate with the scrim be decreased. Conversely, within the higher range of linear scrim speed, it is recommended that the molten extrudate temperature be maintained within the lower range and/or the distance between discharge orifice 12 and the scrim-molten extrudate contact point be increased. These factors can readily be determined in a particular instance having reference to the type of plastic material employed. Thus, operation within the aforestated parameters assures that the molten plastic extrudate in a relatively high state of fluidity flows into and around the scrim network i.e., the interstices defined by the strands comprising the scrim. This results in the scrim being completely enclosed and surrounded by the extrudate plastic subsequent to cooling and solidification thereof, this being illustrated, for example, in FIGS. "2" and "3." Scrim member 16, after contacting molten extrudate 10, is passed between the bite provided by chill roll 20 and nip roll 18 each tangentially engaging opposed sides of the scrim. The width of the bite can be adjusted to provide the desired thickness of the reinforced product 22.

The temperature of chill roll 20 should be such as to cause substantial solidification of the molten extrudate 10 whereby to render same substantially non-flowable as the scrim assembly exits from the bite of chill roll 20 and nip roll 18. The temperature of chill roll 20 is related to the temperature of molten extrudate 10, the linear or coating speed of scrim 16 as well as the distance between the latter and the discharge orifice 12 of extruder 14. As the coating speed and/or molten extrudate temperature is increased, the chill roll temperature is preferably decreased. The scrim-reinforced assembly 22 is thereafter removed from chill roll 20 by any suitable pickup means (not shown) for further processing (optional) such as the container-forming operation to be described in more detail hereinafter.

Referring to FIG. "2," the scrim-reinforced plastic sheet 22 is shown prior to heat shrinking of the film component according to the invention. The product comprises a scrim member 16 that includes two angularly disposed sets of strands 16a and 16b. Each set includes a plurality of strands uniformly spaced to provide about 1 to 5 strands per lineal inch. Each strand 16a, 16b is from about 1 to about 20 mils thick, preferably from 3 to 8 mils. The thickness of the extruded film in the interstices between the strands and the thickness of the film covering the strands is at least ½ mil. The thickness of the film can be the same in the interstices 16d between strands and on the strands, or different. Referring to FIG. 6, the scrim reinforced plastic sheet 22 of FIG. 2 is shown after the film component thereof has been heat shrunk according to the invention. Since the scrim fibers according to this aspect of the invention are substantially less heat shrinkable than the plastic film material, the fibers are bent by the shrinking of the film in which they are securely embedded. In producing the fibers, stresses should be relieved to render the fibers, virtually non-heat shrinkable or at least substantially less heat shrinkable than the film material. The film material extruded according to the method shown in FIG. 1 and described herein, is laid down in one direction and would be heat shrinkable in that direction due to the stresses set up during the extrusion process.

A product similar to that shown in FIG. 6 can be alternatively made from a laminate of preformed outer layers of a heat shrinkable film and an inner layer of scrim material that is substantially less heat shrinkable than the film. The film and scrim layers can be heat or adhesively sealed to each other and subsequently heat shrunk.

According to this aspect of the invention, the film material is typically stressed in one direction when produced and accordingly heat shrinks in that same one direction to relieve these stresses. When preformed film is utilized the film components on either side of the scrim should be oriented so that they heat shrink in the same directon. Film extruded onto the scrim is inherently aligned in the same direction. In this regard, when the film layers are heat shrunk the fibers of the scrim parallel to the heat shrunk direction are buckled, while the transversely dispersed fibers are unaffected, i.e., unbuckled.

The heat shrinking step includes heating the scrim reinforced material of FIG. 2 to a temperature between about 180° F and 225° F and cooling to room temperature. The shrinking of the film without a corresponding degree of shrinking of the fibers results in a bending of the fibers out of the plane of the film and provides the desired nubby or rough appearance and feel as shown in FIG. 6.

The plastic material used in forming the molten extrudate 10 can be selected from a wide variety of materials well known in the art generally including preferably thermoplastic polymeric materials commonly used in the manufacture of plastic bag containers. Preferred for use herein are polyethylene and polypropylene materials capable of forming heat sealable films. Other suitable materials include without necessary limitation polyvinyl chloride, copolymers of vinylidene chloride with vinyl chloride, polyacrylates, copolymers of styrene and acrylonitrile, cellulose triacetate, cellulose acetate butyrate, polyurethane elastomers, polystyrene, polyolefins including homo and interpolymers; generally, thermoplastic polymeric material capable of forming a continuous film on drying from a solvent solution thereof are usable herein, exemplary of synthetic fibers useful herein; useful fibers of the natural type include, without limitation, cotton, wool, hogs hair, horse hair, vicuna and the like. Suitable materials available commercially include the plastic netting available under the trademark "Vexar" manufactured by E. I. du Pont de Nemours & Company which may be prepared from high density polyethylene, low density polyethylene, blends of high and low density polyethylene, polypropylene, polybutylene copolymers of ethylene and propylene and blends of polyethylene. The fiber material may comprise twisted and/or untwisted multifilamentary material, the range of twist ranging from about one-half to 20 turns or more per inch. The strands, as stated, may be of any desired mesh design such as the rectangular configuration illustrated in FIG. "3" and may be of the woven or non-woven type. Usually, there are provided from 1 to about 10 strands per inch with a range of from 3 to 4 strands per inch being particularly preferred. Although scrims of varying thickness and patterns may be used, it is nevertheless, preferred that the scrim weight be from about 1 to 2 lbs./Mft.$^2$ In accordance with a particularly preferred embodiment in terms of cost and performance, the thermoplastic material comprising the molten extrudate is polyethylene while the scrim material comprise polypropylene, preferably of the oriented type as is well known in the art. As explained, the process if preferably carried out utilizing an extruder for producing the molten form of the film forming plastic material. However, it will be understood that other methods may be effectively employed for providing the requisite form of the molten plastic e.g., in the form of a molten extrudate. Moreover, other methods for forming the solidified, coated scrim assembly can be used such as an air knife coating technique utilizing cold air to effect cooling and solidification of the molten plastic. In any event, the essential criteria is the fluidity of the molten plastic at the time it contacts the scrim network. As explained previously, the extruding parameters should be chosen to effect at least substantial solidification of the molten plastic by the time it emerges from the bite of chilling roll 20 and nip roll 18. Thus, as the scrim speed and/or molten plastic temperature is increased, the temperature of the chilling roll should correspondingly be decreased consistent with the foregoing requirements.

The scrim-reinforced plastic sheet produced as described is particularly advantageously adapted to be formed into plastic bags of significantly improved strength. Thus, by virtue of contacting the molten plastic as described with an "unsupported" scrim, the quoted term connoting the absence any backing or support sheet whatsoever, there is obtained a sheet product having improved impact strength, tear and tensile strength. For example, when processes as described herein, it is found that the scrim imparts strength improvements of 33% in impact, doubled tear and quadrupled breaking strength. Plastic bag containers fabricated with the thus-reinforced plastic sheet material are accordingly capable of accommodating larger payloads, under higher stress conditions for longer periods of use. Moreover, since any requirement for a backing or support sheet is eliminated, the reinforced sheets are more economical to manufacture than the scrim-reinforced materials heretofore provided. One of the particularly surprising and unexpected advantages of the present invention in the fact that the product sheet material exhibits vastly improved strength properties despite the fact that a backing or support sheet is not used. In addition to reducing cost, this aspect enables the sheet forming processing to be simplified significantly leading to even greater savings.

The scrim-reinforced film 22 is collected by any suitable means, not shown, from chill roll 20 and folded longitudinally upon itself as illustrated in FIG. "3" into equal half sections. This can be accomplished, for example, by any conventional folding means as is well known in the art. In this manner, the film 22 of original width W (FIG. 3) is divided into sections 28 and 30 (FIG. 5) of width W/2 by means of longitudinal fold 32. The film 22 is transported in the direction indicated by arrow in FIG. "3" to a hot knife member generally designated 34 comprising a blade portion 36 rotatable about an axle portion 38 in the direction indicated. The hot knife is maintained at a temperature which is sufficient to effect fusing i.e., heat bonding of Sections 28 and 30 along the cutting locii of the hot knife as illustrated at 40 and 42, FIG. "5." The rotary speed of Blade 36 and the linear speed of film 22 in the direction indicated by arrow 34 are controlled so that the cutting is effected at predetermined portions of film 22 to produce plastic bag containers such as illustrated in FIG. "5." Thus, heat sealed side portions 40 and 42 in combination with the bottom portion formed by longitudinal fold 32 provide a restraining portion 44 for accommodating various types of articles e.g., as part of a packaging operation, articles normally accumulated during shopping, or as a trash container, etc. The dimensions of the plastic bag container can be varied as desired by for example, appropriately controlling the rotary speed of hot knife 34 and/or the linear speed of film 22.

What is claimed is:

1. A reinforced plastic sheet material comprising a scrim which includes two sets of angularly disposed strands that intersect at points of intersection each set comprising a plurality of uniformly spaced strands, and a continuous film of plastic material covering both sides of said strands and extending between said strands, said plastic material completely enclosing and surrounding said scrim said plastic material having substantially greater heat shrinking properties than said scrim to result in a plurality of said strands being buckled between the points of intersection of said intersecting strands and providing said material with a rough, nubby surface that is both visually and tactilely discernible.

2. Plastic sheet material according to claim 1 wherein said strands are from about 1 to about 20 mils thick.

3. Plastic sheet material according to claim 1 wherein said sets of strands are perpendicularly disposed.

4. Plastic sheet material according to claim 1 wherein said plastic film material comprises thermoplastic, film-forming polymer.

5. Plastic sheet material according to claim 4 wherein said polymer comprises polyethylene.

6. Plastic sheet material according to claim 4 wherein said plastic film material is heat shrinkable in only one direction and said scrim fibers parallel to said direction are buckled and said scrim fibers transverse to said one direction are not buckled.

* * * * *